(12) United States Patent
Rhea et al.

(10) Patent No.: US 7,008,002 B2
(45) Date of Patent: Mar. 7, 2006

(54) AUTOMATED COVERING FOR AN AUTOMOBILE

(75) Inventors: Thomas C. Rhea, 113 Magnolia Dr., #103, Franklin, TN (US) 37064; Jerry Richmond Johnson, Raleigh, NC (US); Mitchell Steven Troublefield, Holly Springs, NC (US)

(73) Assignee: Thomas C. Rhea, Franklin, TN (US)

( * ) Notice: Subject to any disclaimer, the term of this patent is extended or adjusted under 35 U.S.C. 154(b) by 16 days.

(21) Appl. No.: 11/038,724

(22) Filed: Jan. 19, 2005

(65) Prior Publication Data
US 2005/0127710 A1    Jun. 16, 2005

Related U.S. Application Data

(63) Continuation of application No. 10/386,914, filed on Mar. 12, 2003, now Pat. No. 6,916,043.

(51) Int. Cl.
*B60J 7/20* (2006.01)
(52) U.S. Cl. .................. 296/136.01; 296/95.1; 280/848
(58) Field of Classification Search .......... 296/136.01, 296/98, 136.03, 136.04, 136.11, 136.12, 95.1; 150/166; 280/770, 848
See application file for complete search history.

(56) References Cited

U.S. PATENT DOCUMENTS

| | | | | |
|---|---|---|---|---|
| 3,763,908 A | * | 10/1973 | Norman | 150/166 |
| 4,216,989 A | * | 8/1980 | Tackett | 296/136.04 |
| 4,432,581 A | * | 2/1984 | Guma | 296/136.03 |
| 4,475,764 A | * | 10/1984 | Hutchinson et al. | 296/136.11 |
| 4,764,998 A | * | 8/1988 | Norris et al. | 4/502 |
| 4,815,784 A | * | 3/1989 | Zheng | 296/97.7 |
| 4,834,128 A | * | 5/1989 | Burgess | 135/88.06 |
| 4,834,446 A | * | 5/1989 | Tung-Chow | 296/136.03 |
| 4,856,842 A | * | 8/1989 | Ross et al. | 296/136.03 |
| 5,022,700 A | * | 6/1991 | Fasiska et al. | 296/98 |
| 5,056,839 A | * | 10/1991 | Yoon | 293/117 |
| 5,078,330 A | * | 1/1992 | Hall | 242/390.8 |
| D330,697 S | * | 11/1992 | Zhou | D12/401 |
| 5,167,267 A | * | 12/1992 | McQuaid | 150/166 |
| 5,176,421 A | * | 1/1993 | Fasiska | 296/136.03 |
| 5,188,417 A | * | 2/1993 | Curchod | 296/136.04 |
| 5,271,998 A | * | 12/1993 | Duckett | 442/220 |
| 5,291,934 A | | 3/1994 | Ouvrard et al. | 160/310 |
| 5,294,167 A | * | 3/1994 | Yu | 242/372 |
| 5,378,035 A | * | 1/1995 | Wu | 296/136.03 |
| 5,388,883 A | * | 2/1995 | Yang | 296/136.1 |
| 5,429,406 A | * | 7/1995 | Huang | 296/95.1 |

(Continued)

*Primary Examiner*—Lori L. Coletta
(74) *Attorney, Agent, or Firm*—Waddey & Patterson, P.C.; Phillip E. Walker

(57) ABSTRACT

A vehicle is equipped with an automated device for covering the windows of the vehicle. The device comprises a collection container, a plurality of the extensions attached to the collection container, a motor attached to the collection container to rotate the collection container, and a covering attached to the plurality of extensions and sized to cover the windows of the vehicle. The rotation of the collection container extends and retracts the plurality of extensions which results in the deployment of the covering over the windows of the vehicle and the collection of the covering from the windows of the vehicle. In a preferred embodiment, the plurality of extensions comprises malleable metal strips with eyelets at the end of the metal strips. The eyelets and the metal strips are positioned within sleeves or channels which are made integral to the covering. The covering includes a reflective fabric that is substantially opaque to sunlight.

20 Claims, 9 Drawing Sheets

U.S. PATENT DOCUMENTS

| | | | |
|---|---|---|---|
| 5,456,515 A * | 10/1995 | Dang | 296/95.1 |
| 5,468,040 A | 11/1995 | Hsieh et al. | 296/97.4 |
| 5,490,707 A * | 2/1996 | De La Cruz | 296/95.1 |
| 5,516,181 A * | 5/1996 | Thompson | 296/98 |
| 5,597,196 A * | 1/1997 | Gibbs | 296/98 |
| 5,597,197 A * | 1/1997 | Mowar et al. | 296/136.04 |
| D381,620 S * | 7/1997 | Hunter | D12/401 |
| 5,752,560 A | 5/1998 | Cherng | |
| 5,762,393 A * | 6/1998 | Darmas, Sr. | 296/98 |
| 5,795,012 A * | 8/1998 | Liou et al. | 296/136.13 |
| 5,855,406 A * | 1/1999 | Vargo | 296/136.03 |
| 6,012,759 A * | 1/2000 | Adamek | 296/136.03 |
| 6,568,737 B1 * | 5/2003 | Li | 296/95.1 |
| 6,641,203 B1 * | 11/2003 | Everett | 296/136.11 |
| 2002/0033618 A1 | 3/2002 | Schlecht et al. | 296/138 |

* cited by examiner

AUTOMATED COVERING FOR AN AUTOMOBILE

CROSS-REFERENCES TO RELATED APPLICATIONS

This application is a Continuation application which claims benefit of U.S. patent application Ser. No. 10/386,914 filed Mar. 12, 2003 now U.S. Pat. No. 6,916,043, entitled "Automated Covering For An Automobile" which is hereby incorporated by reference in it entirety.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

A portion of the disclosure of this patent document contains material that is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

FIELD OF THE INVENTION

The present invention relates generally to an automated covering for an automobile, and more specifically to a sunshade that automatically deploys to cover the windows of an automobile and automatically retracts to a centralized location.

BACKGROUND OF THE INVENTION

Automobiles are subject to a so-called "greenhouse effect". This well understood scientific phenomenon results when short wave heat radiation from the sun traverses the glass windows of a vehicle and is absorbed by the material internal to the vehicle. This results in the heating of the passenger portion of the automobile. Also, the glass windows of an automobile are opaque to the longer wave heat radiation emitted from the heated material. As such, the glass acts as a conduit for the heat from the sun to enter the vehicle and as a deterrent for the heat generated by the heating of the material within the vehicle from escaping back out of the glass. As a result, the temperature inside the vehicle will rise to until equilibrium is reached between the heat conducted out through the walls and roof of the vehicle and the amount of heat entering through the windows.

Automobiles are also heated through the conduction of heat through the walls and roof of the automobile. This is due to the fact that the insulation in the roof and walls of typical automobiles is a fraction of what is needed to reduce the inward conduction of heat into the vehicle.

As a result, the temperature of the interior of automobiles that are parked in the sun in hot climates can rise to as much as 150° Fahrenheit. After existing in this condition for a while, not only is the air in the automobile very hot, but all of the material in the interior of the automobile, including the dashboard, seats, armrests, etc., are very hot as well. This heat penetrates to a depth of several inches and reduces the useful life of the interior of the automobile. It can take upwards of twenty (20) minutes for even the best automobile air-conditioner to cool the interior of an automobile to a comfortable temperature.

Several devices have been developed in an attempt to reduce the heat build up in automobiles. For example, tinted glass is used to deflect some of the heat from the sun's rays before it enters in the vehicle. However, due to the limitations by most state transportation departments, it is illegal to tint the windows to a level that adequately reflects the sunlight. Also, the tinted glass does not help insulate the roof or the walls of the vehicle.

Other attempts to combat this problem have resulted in the development of windshield reflectors. For example, U.S. Pat. No. 5,291,934, issued to Ouvrard, et al., U.S. Pat. No. 5,468,040, issued to Peng Hsieh, et al. and U.S. Pat. No. 5,752,560, issued to Cherng discloses power operated sunshades for automobiles comprising extension rods that are placed within the vehicle in an effort to reduce the amount of heat from the sun within the vehicle. All of these prior art patents have drawbacks in that they take up valuable space within the vehicle, are not aesthetically pleasing, and do not adequately reduce all of the heat within a vehicle because they provide no protection for the roof of the vehicle or the side windows of the vehicle.

Other prior art devices have been used in an attempt to reduce the level of heat within a vehicle. For example, several vehicle covers exist which require manual placement over the vehicle in order to block the sunlight from entering the vehicle. A few automated systems exist, including U.S. Pat. No. 4,432,581, issued to Guma and U.S. patent application Publication No. 2002/0033616 A1 issued to Schlecht et al. However, these devices are bulky and cumbersome. These devices also require numerous adaptations made to the vehicle in order to support the cover.

Thus, it is seen that there is need in the art for an automated covering for a vehicle used to protect the vehicle and block sunlight from entering the vehicle thereby reducing the internal temperature of the vehicle. What is needed, then, is

SUMMARY OF THE INVENTION

A vehicle is equipped with an automated device for covering its windows. The device comprises a collection container, a plurality of extensions attached to the collection container, a motor attached to the collection container to rotate the collection container, and a covering attached to the plurality of extensions and sized to cover the windows of the vehicle. The rotation of the collection container extends and retracts the plurality of extensions which results in the deployment of the covering over the windows of the vehicle and the collection of the covering from the windows of the vehicle. In a preferred embodiment, the plurality of extensions comprises malleable metal strips with eyelets at the end of the metal strips. The eyelets and the metal strips are positioned within sleeves or channels which are made integral to the covering. The covering includes a reflective fabric that is substantially opaque to sunlight. The device includes a base attached to the collection container and positioned to attach to either the roof of the vehicle, the top of the trunk of the vehicle, within the trunk of the vehicle, or under the hood of the vehicle. The device further includes a top attached to the collection container and position to retain the covering when the plurality of extensions are retracted and the covering is collected.

It will be noted that, for the sake of convenience, the following description will be written in terms of an automated device for covering the windows of an automobile (or car); however, such is for convenience only. The skilled artisan will recognize that the inventive device is equally applicable to other vehicles, such as trucks, boats, airplanes and the like.

Several methods of deploying and collecting a covering are also disclosed. One method of deploying a covering over the windows of an automobile includes attaching a covering to a plurality of extensions and radially extending the plurality of extensions from a centralized location. A method of collecting the covering from the windows of automobiles includes attaching a covering to a plurality of extensions and radially retracting the plurality of extensions to a centralized location.

A method for covering and uncovering the windows of automobiles is also included. This method includes attaching a covering to a plurality of cables, attaching the cables around a plurality of cylinders, routing the plurality of cables along at least one track, and rotating the plurality of cylinders.

In a preferred embodiment, the device is called an automobile sunshade and comprises a large piece of cloth and two primary mechanical sub-assemblies: Lower and Upper.

In this embodiment, the cloth is of a size and shape to cover the roof of a car and all the windows (including the windshield). It is composed of at least 2 layers of fabric which are nearly opaque to sunlight. The outer layer is also highly reflective.

In this embodiment, the lower sub-assembly extends and retracts the cloth by extending and retracting a plurality of semi-stiff metal strips which are positioned in an equal number of separate "sleeves" which are sewn in the cloth. In a typical embodiment, useful for most automobiles, including SUVs, 30 such strips are employed. Each sleeve begins near the center of the cloth and traverses a unique path to a point near the edge of the cloth so that no point on the cloth is further from a sleeve than that needed to ensure full retraction and collection of the cloth (typically this distance is about 10 inches) and so that each sleeve is the same length as all the others. The external end of each metal strip is fastened to the cloth at its termination point in its sleeve near the edge of the cloth. As the metal strips are extended, the external end of each strip pushes its termination point on the cloth out away from the center. Since all the cloth is "gathered" near the center before the process of extension begins, the metal strips slide through the sleeves except for the termination point, which is fastened to the end of the metal strip. When the strips are fully extended, the cloth is fully deployed. Retracting the metal strips reverses the process, gathering the cloth. When the cloth is tightly gathered around the center, the retraction process is complete.

In this embodiment, the internal end of each metal strip terminates near the center of the "drum." Three "drum spacers" are sandwiched in between the disks. There are, therefore, three "drum sectors," each of which is defined by a spacer and its two adjacent disks. The internal end of each metal strip is fastened near the center of a drum sector. In the instance where there are 30 strips, ten metal strips proceed from each sector. Each drum spacer is a little bit thicker than the width of a metal strip so that there is space to allow the strips to be wound, and unwound, around the center of the drum when the drum is rotated in one direction or the other. Around the periphery of the drum are a plurality of "rollers" which are somewhat longer than the total thickness of the drum. Each roller has several circumferential grooves. The width and spacing of the grooves are such that when positioned next to the drum, the disks are inserted into the grooves. The rollers are mounted in such a way as to allow them to rotate when the drum rotates. The metal strips are positioned so that one strip from each drum sector extends from the space between two adjacent rollers. When the metal strips are fully extended, the external end of each is at the edge of the drum. Therefore, when they are extended, they all protrude from the drum an equal amount.

In this embodiment, a gear is fastened to the top of the drum to allow a motor to rotate the drum in both directions. One or more devices, which protrude above the gear, push an "indexer" as the drum rotates. This allows electrical switches to be automatically activated when the drum is rotated to the two extreme points of the metal strip positions: fully extended and fully retracted.

In this embodiment, the upper assembly includes at least two separate designs. The first design of this upper assembly includes a lid for the entire mechanism and a mechanical system which can raise the lid to allow the cloth to be deployed and lower it when the cloth is fully retracted. The lift system uses a rotating screw driven by a motor to provide the vertical motion. To make the system compact, a double telescoping screw design can be used in which the first screw is hollowed out and threaded inside. A smaller screw is then inserted. This gives almost twice the vertical movement for a given height, or screw length.

The second design of this upper assembly includes a lid for the entire mechanism and a series of "flaps" around the periphery which can be opened to allow the cloth to be deployed or closed when the cloth is fully retracted. The flaps are connected to the lid by hinges. "Rods" are positioned approximately radially from near the center of the mechanism. The outer end of each rod is connected to a flap in such a way that when a rod is pushed outwards from the center of the mechanism, its corresponding flap opens. Similarly pulling a rod towards the center of the mechanism closes a flap. The inner end of each rod terminates at a small disk in the center and is mounted in such a way that when the disk rotates a few degrees, the rods are pushed towards, or pulled away from, the outer edge of the mechanism, thus opening or closing the flaps. A motor and gears provide torque to this disk.

In this embodiment, there are other components to this embodiment of the system. For example, to keep the cloth from deploying in a position that is out of alignment from the intended one, and to provide a measure of vertical restraint to the cloth in wind, there are four "tracks" that extend from the drum to the four corners of the top of the automobile. Small "sliders" can travel along the tracks. A small "eyebolt" is extends up from each slider. A hole is cut in each corner-most sleeve of the cloth near the position of the corner of the top of the automobile to allow the eyebolt to be inserted and to clamp loosely around the metal strip therein. Then when the cloth is deployed, the metal strip slides through the eyebolt until the portion of the cloth between the corner and the eyebolt is no longer gathered. At this point the slider is forced to slide to the corner of the top of the car where it restrains the cloth in all directions except along the direction of the track. Sliders are located also at points $\frac{1}{3}$ and $\frac{2}{3}$ of the distance from the corner of the top of the car to the center of the mechanism.

Another component in this embodiment is the electrical control system. This system directs the operation of the motors in proper sequence and senses the "limit switches" to determine when motors should be turned off. This system is connected to the central locking system of the car so that when the doors are locked, the device will deploy the cloth automatically; similarly, when the doors are unlocked, the device will retract the cloth. An override switch is available to prevent deploying if desired.

A second embodiment of the device uses a sunshade deployment mechanism that is incorporated into the design of an automobile body. In this second embodiment, the forward portion of the trunk lid is a flap mounted on hinges. Extending from this flap are tracks that proceed up the edges of the rear window, forward along the edges of the roof of the car, and down along the sides of the windshield. These tracks are "internal" in the sense that they have no noticeable external features, but there is a slit along the full length of each track. Within each slit is a mechanical cable that runs its full length. Attached to the cloth are sliders that slide along the tracks. The first slider on each side is also attached to its corresponding cable. As the cables move, the cloth is thus pulled along.

In this second embodiment, the cloth is stored in a compartment in or on the trunk. The design may be inverted front-to-back so that the flap and mechanism are in the back portion of the hood instead of the front portion of the trunk. When the cloth is to be deployed, the flap on the front of the trunk lid opens, and the cables hidden within the tracks pull the cloth out of the trunk and over the car. About 3–4 sleeves running the full length of the cloth contain lighter weight cables that are attached at the front edge of the cloth. When the cloth is being retracted, these cables are pulled at the same speed as the cables inside the tracks and help to fully gather the cloth. When the cloth is being deployed, these cables are disengaged from their drive mechanism so that they can be pulled along easily by the advancing front edge of the cloth. In all embodiments, in order to provide more thermal insulation, the portion of the cloth that covers the roof of the car may be inflatable or otherwise designed to stand off from the surface of the roof.

For automobiles with no trunk, such as minivans and SUVs, the rear hatch could be made to be "thicker" than normal and could contain an internal compartment with a flap, or an external compartment that contains the cloth and the drive mechanism.

It is therefore a general object of the present invention to provide an automated covering for a vehicle such as an automobile.

Another object of the present invention is to keep sunlight from transmitting through the windows of the vehicle in order keep from heating the interior of the vehicle.

Yet another object of the present invention is to prevent sunlight from increasing the temperature of the roof of the vehicle and thereby allowing conduction of heat inward to the interior of the vehicle Still another object of the present invention to provide a covering that is automatically deployed over the top and windows of vehicle.

Another object of the present invention is to provide a device that is automatically collected from around the windows and top of a vehicle.

Still another object of the present invention is to provide a cloth covering that is highly reflective and substantially opaque to light in order to cover the top and windows of a vehicle.

Yet another object of the present invention is to provide a covering for a vehicle that is deployable and retractable along tracks positioned along the top of the vehicle.

And yet still another object of the present invention is to provide covering that is deployable and retractable that the use of extensions that move radially with respect to a centralized location.

BRIEF DESCRIPTION OF THE DRAWINGS

FIG. 8C shows the flaps of this embodiment of the top in an opened position.

FIG. 10*c* shows the covering fully deployed.

DESCRIPTION OF THE PREFERRED EMBODIMENTS

Figure 1:
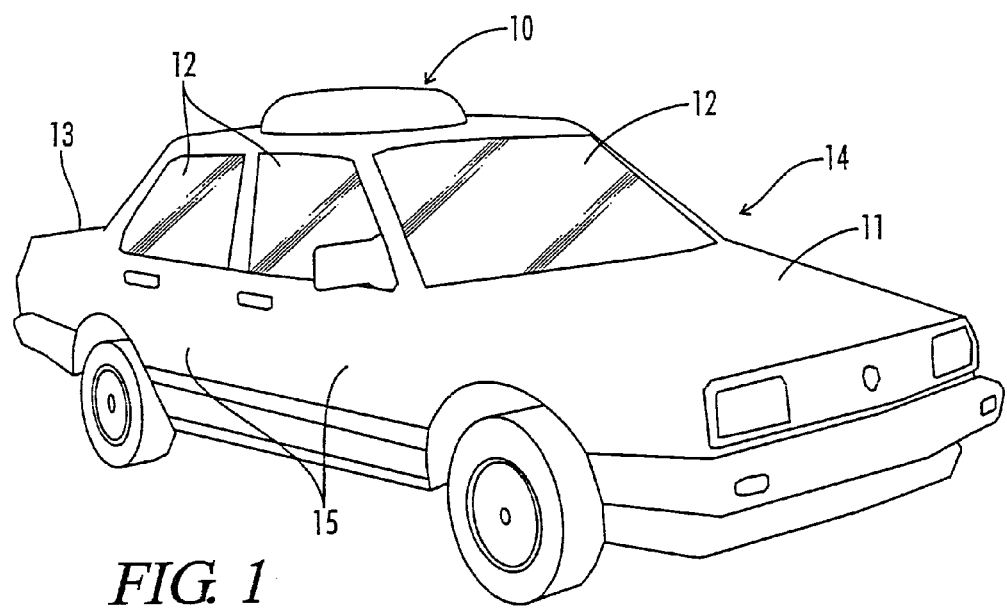
FIG. 1 is a perspective view of a vehicle with the device positioned on the roof of the vehicle in a retracted manner.
Figure 2:
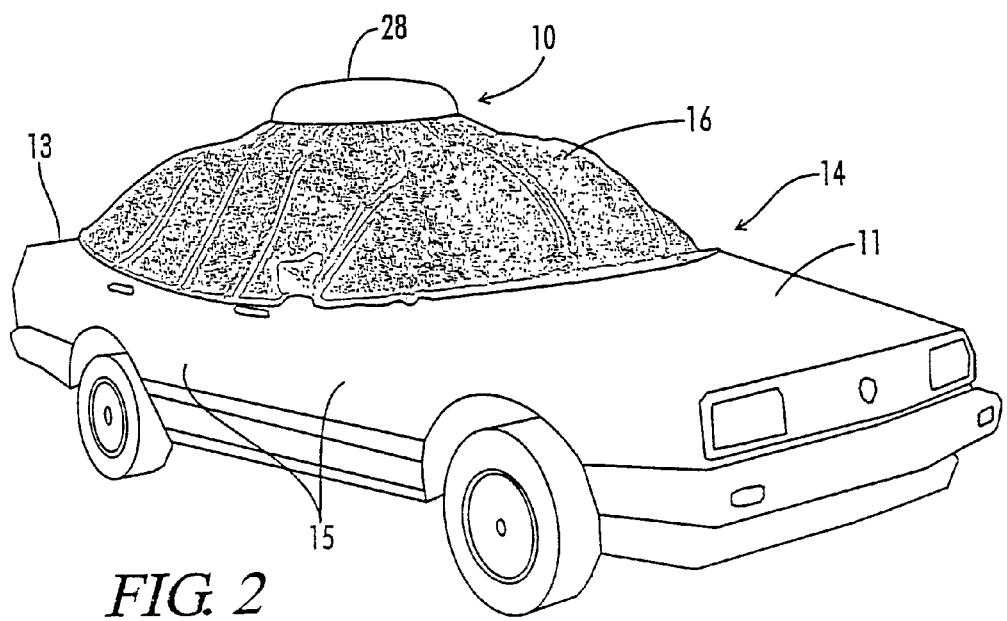
FIG. 2 is a perspective view of a vehicle with the device deployed and covering the roof and windows of the vehicle.
Figure 3:
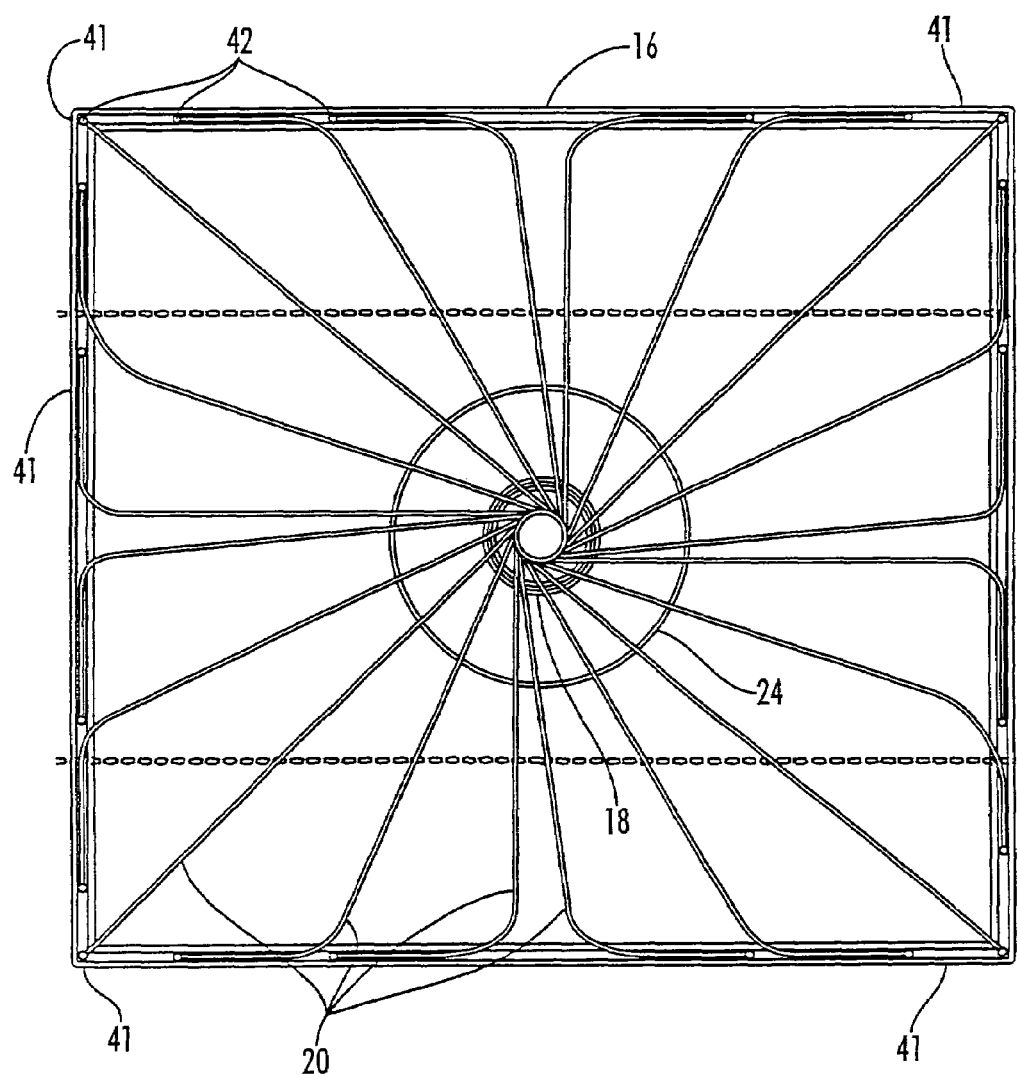
FIG. 3 is a schematic plan view of one embodiment of the current invention showing the plurality of extensions radiating from a central location.

Referring now to FIG. 1, an automated device 10 covering the windows 12 of an automobile 14 is generally shown. FIG. 2 shows the device 10 with the covering 16, which could also be described as a cloth 16, deployed over the automobile 14.

Figure 4:
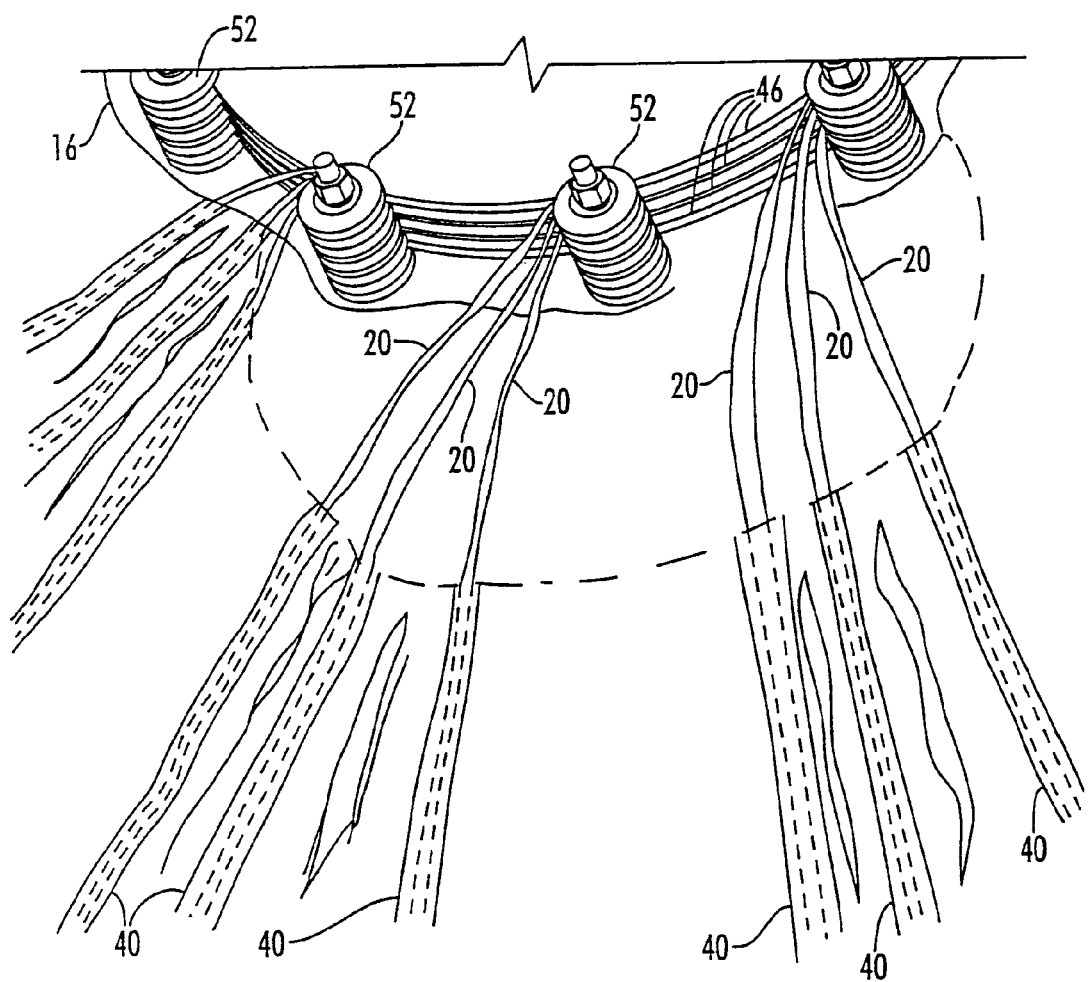
FIG. 4 is a perspective view of a portion of one embodiment of the current invention showing a partial cut away of the relationship between the extensions and the sleeves of the covering.

As seen in FIG. 4, the device 10 comprises a collection container 18, which could also be described as a drum 18 or a spool 18. The device 10 further comprises a plurality of extensions 20, also called a plurality of malleable strips 20 or a plurality of semi-stiff metal strips 20, attached to the collection container 18, a motor 22 attached to the collection container 18 to rotate the collection container 18, and a covering 16 attached to the plurality of extensions 20 and sized to cover the windows 12 of an automobile 14.

The device 10 further includes a base 24 attached to the collection container 18 to position to engage the automobile 14. The base can include connection slots 26 designed to facilitate attachment of the device 10 to the automobile 14. This connection can be by any means known to attach an item to a vehicle including but not limited to straps, fasteners, magnets, bolts, welding, and the like. If the automobile 14 is equipped with a luggage rack (not shown), the connection slots 26 of the base 24 can attach to the luggage rack.

Figure 7:
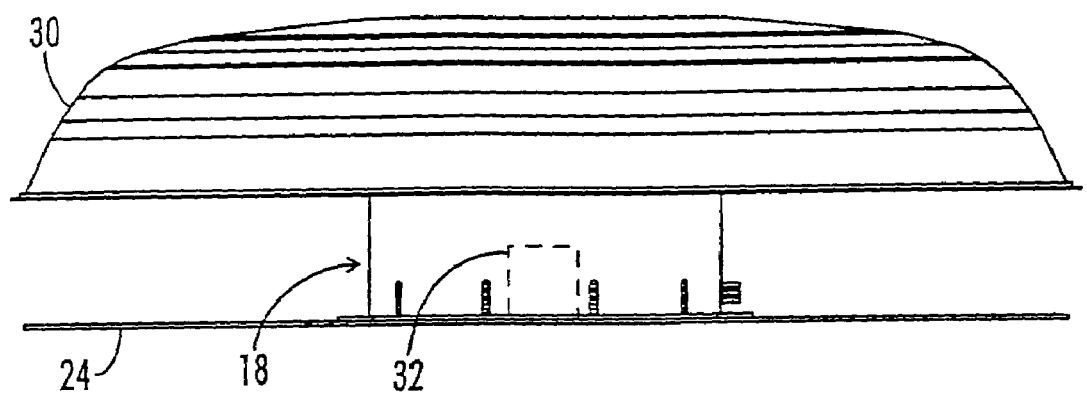
FIG. 7 is a schematic side view of one embodiment of the current invention showing the base, drum, and top in a raised manner to allow the deployment and collection of the covering. For ease of illustration the extensions guides and covering are not shown.

The device 10 further includes a top 28 attached to the collection container 18 and positioned to retain the covering 16 when the plurality of extensions 20 are retracted. As seen in FIG. 7, one embodiment of the top 28 includes a dome shape lid 30 and a lifting motor 32 attached to the lid 30 and positioned to raise and lower the lid 30. This raising and lower of the lid 30 permits the extension and retraction of the plurality of extensions 20. It also allows the covering 16 to be deployed when the device 10 is activated and allows for protection of the covering 16 and the plurality of extensions 20 when the device 10 is not in use.

Figure 8A:
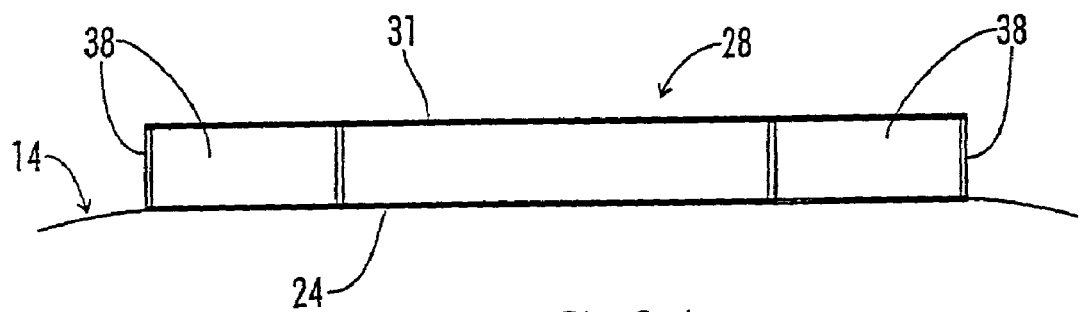
FIG. 8A is a side view of one embodiment of the top showing the flaps in a closed position.
Figure 8B:
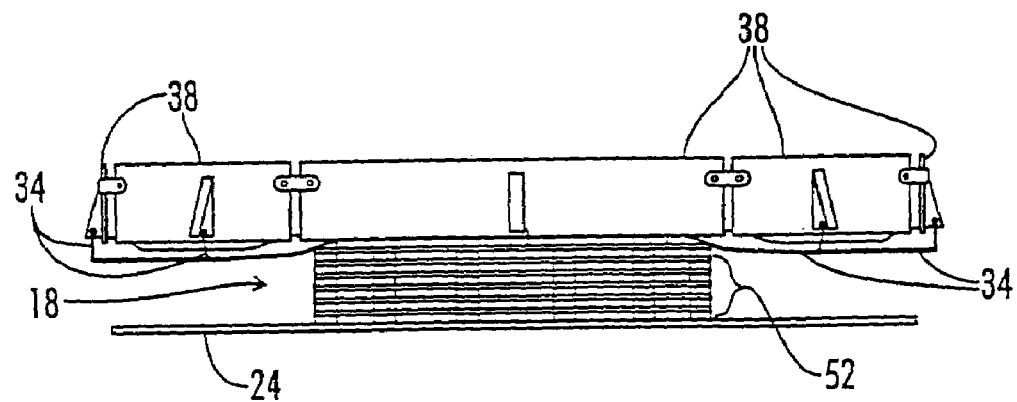
FIG. 8B is a side view similar to FIG. 8A showing the flaps of this embodiment of the top in a raised position. For ease of illustration the extensions guides and covering are not shown.
Figure 8C:
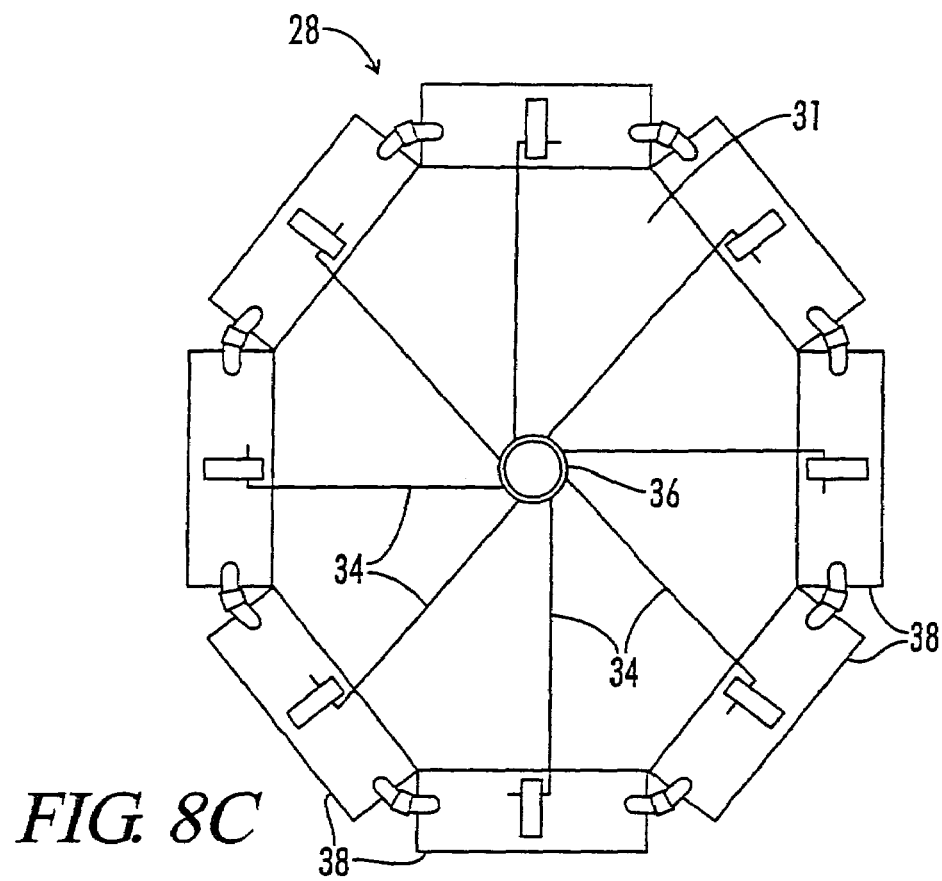
FIG. 8C is a bottom view of the top shown in FIGS. 8A and 8B.

As seen in FIGS. 8a and 8b, a second embodiment of the top includes a stationary lid 31, a plurality of rods 34 extending radially from a cylinder 36 attached to the stationary lid 31, and a plurality of adjustable adjuncts 38, which can also be described as flaps 38, hinged to the stationary lid 31. Each adjunct 38 is attached to one of the rods 34 such that rotation of the cylinder 36 opens and closes the plurality of adjustable adjuncts 38.

As seen in FIGS. 8a and 8b, the plurality of flaps 38 are hinged to the stationary lid 31 and are loosely attached to each adjacent flap 38. This connection allows for ease of operation in the opening and closing of the plurality of flaps 38 during operation of the device 10. The plurality of rods 34 are attached to the plurality of flaps 38 in such a manner as to reduce snagging of the covering 16 as the covering 16 is deployed and retracted from the device 10. The lid 31 is shown in an octagon shape. However, the lid 31 can be circular or take any polygonal shape and still maintain its functionality.

The top 28 also includes safety features used to control the opening and closing of the top 28. For example, in one embodiment of the top 28, limits switches (not shown) and gears (not shown) control small rotation of a cylinder 36 to which the plurality of rods 34 are attached. This allows the required movement in the plurality of flaps with a small amount of rotation in the cylinder 36.

In another embodiment of the top 28, the dome shaped lid 30 uses a large rotating screw (not shown) driven by the lifting motor 32 to provide the vertical motion for the dome shaped lid 30. This large rotating screw can be a double telescoping screw which comprises a large screw with internal threads accepting a smaller screw (not shown) allowing for almost twice the vertical movement for a given screw length.

As seen in FIG. 4, the covering 16 includes a plurality of sleeves 40, which can also be called a plurality of channels 40, made into the covering 16 that are shaped to receive one of the extensions 20. The extensions 20 include attachment ends 42, also called eyelets 42, connecting each extension 20 to the covering 16. The attachment ends 42 anchor into the farthest extremity 41 of each sleeve 40. This connection facilitates the deployment of the covering 16 as the plurality of extensions 20 expand radially from the collection container 18. Also, this connection between the attachment ends 42 and the sleeves 40 facilitate the collection of the covering 16 when the plurality of extensions 20 are retracted.

The covering 16 includes reflective fabric that is substantially opaque to sunlight. In a preferred embodiment, the covering 16 is exposed to at least two layers of reflective fabric that is nearly opaque to sunlight. The outer layer of these two layers is also highly reflective. The covering 16 could also be designed with several openings (not shown) to prevent damage from the wind The control system 44 of the device 10 controls the operation of a motor 22 and the movement of the top 28. The control system 44 can also be described as electrical control system 44 that directs the operation of the device 10 in a proper sequence. The control system 44 includes conventional limit switches that determine when the motors should be turned off. In a preferred embodiment, the control system 44 of the device 10 is connected to the central locking system (not shown) of the automobile 14 so that when the doors 15 of the automobile 14 are locked, the device 10 will deploy the covering 16 automatically. Similarly, when the doors 15 are unlocked, the device 10 will retract the covering 16. In an alternate embodiment, an override switch (not shown) is available to prevent the deployment of the covering 16.

The extension and retraction of the plurality extensions 20 is accomplished through the winding and unwinding of the plurality of extensions 20 around the drum 18. The semi-stiff yet malleable nature of the plurality of extensions 20 allows the collection or winding of these extensions 20 around the collection container 18. However, at the same time the plurality of extensions 20 are stiff enough to project outward from the drum 18 as the drum 18 rotates in a direction counter to the collection direction. That is one direction of rotation for the drum 18 collects the plurality of extensions 20, while the opposite direction of rotation for the drum 18 deploys or extends the plurality of extensions 20.

Figure 5:
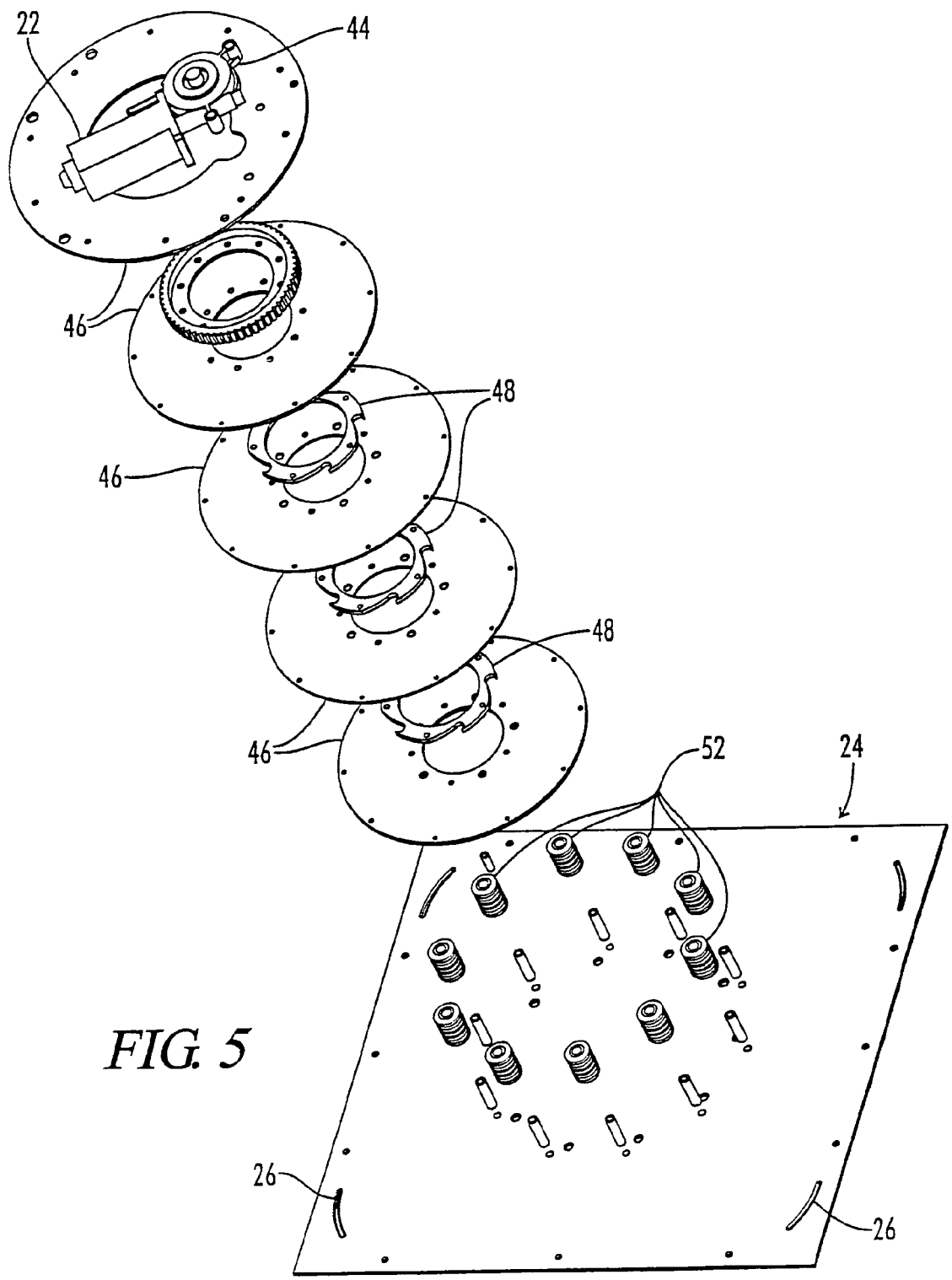
FIG. 5 is a perspective expanded view of the drum and base including the plurality of guides to direct the plurality of extensions into the drum.

As seen in FIG. 5, the collection container 18 includes a plurality of disk 46 at a plurality of spacers 48 positioned between the plurality of disk 46. The configuration of the spacers 48 and the disk 46 form collection openings 50 or collections spools 51, sized to receive the plurality of extensions 20 as the collection container 18 rotates. In a preferred embodiment, the drum 18 is composed of four disks 46 each of which is about 8.5 inches in diameter and $\frac{1}{16}$ to $\frac{1}{8}$ inch in thickness.

Figure 6A:
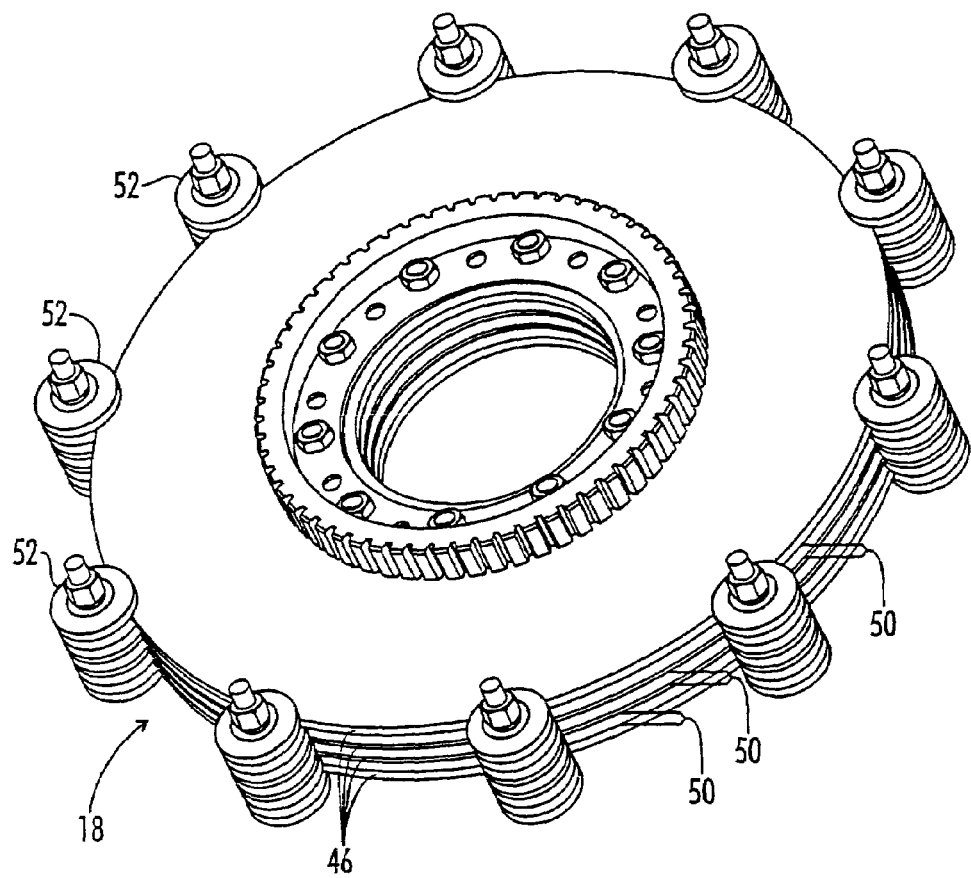
FIG. 6A is a perspective assembled view of the drum and the plurality of guides shown in FIG. 5.
Figure 6B:
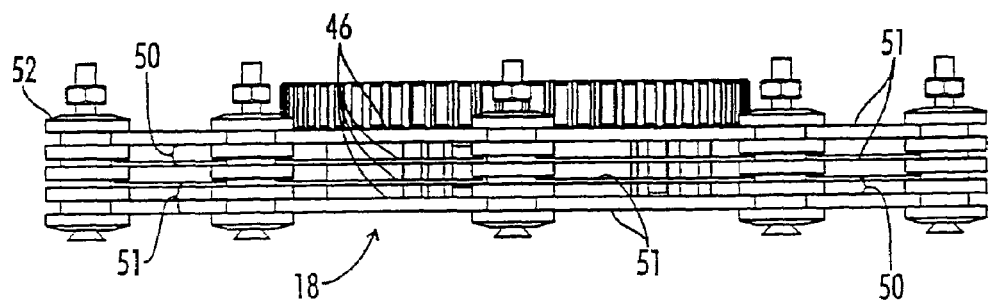
FIG. 6B is a side elevation view of the drum and the plurality of guides shown in FIGS. 5 and 6A.

As seen in FIGS. 5 and 6, the device also includes a plurality of guides 52 engaging the plurality of disk 46 that comprised the drum 18. The plurality of guides 52 directs the plurality of extensions 20 into and out of the collection openings 50 of the collection container 18. The plurality of guides 52 rotate in an opposite direction from the rotation of the drum 18 as the drum 18 rotates. This rotation reduces the amount of friction within the device 10 and facilitates easier deployment and retraction of the plurality of extensions 20. In a preferred embodiment there are 10 guides 52 and each guide 52 has disk like members aligned to create four circumferential grooves, the internal diameter of each circumferential groove being about $\frac{1}{2}$ inch.

Figure 9:
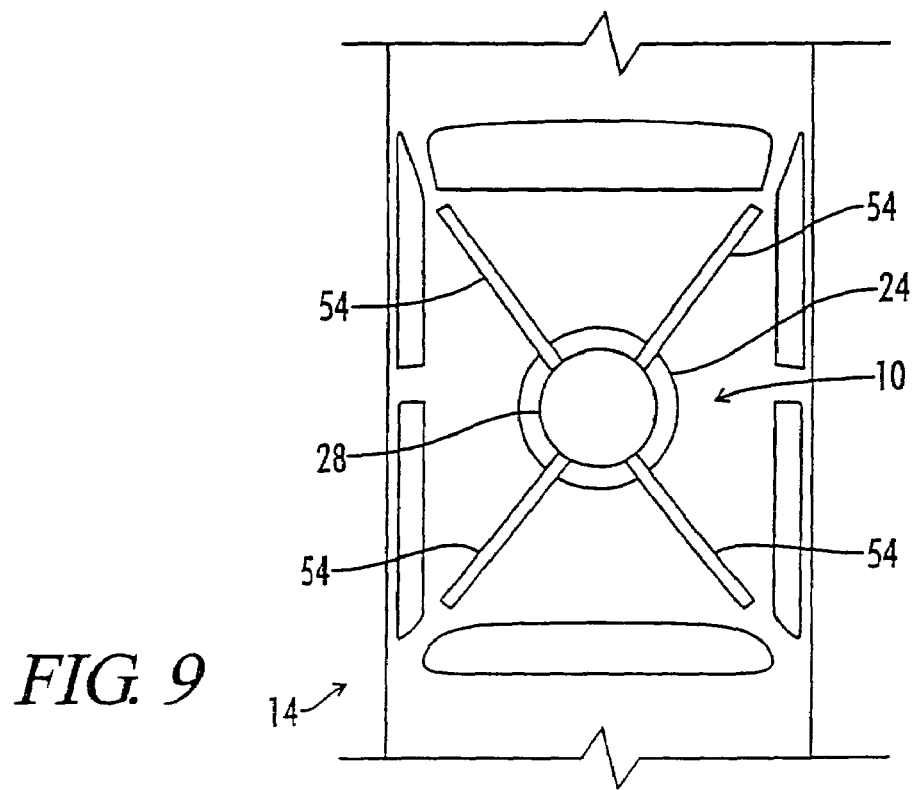
FIG. 9 is a top view of one embodiment of the current invention showing the tracks extending operatively out from the base toward the four corners of the top of the vehicle. The covering in this illustration is retracted within the top and base of the device.

As seen in FIG. 9, one embodiment of the device 10 includes plurality of tracks 54 operatively extending from the base 24 and position to guide the covering 16 during deployment of the device 10. In one embodiment, the tracks 54 extend to the four corners of the automobile 14. The tracks are used to facilitate the correct alignment of the covering 16 over the windows 12 of the automobile 14.

The tracks 54 also facilitate holding the covering 16 in place during deployment of the device 10 in inclement weather. This can be accomplished through the use of a plurality of sliding guides 56 attached to the covering 16 and position in the tracks 54 to guide the covering 16 during deployment. A sliding guide 56 is shaped to fit within the tracks 54 and travel along with tracks 54. A fastener 58, also known as an eyebolt 58, extends from each sliding guide 56 to engage one of the extensions 20 during deployment of device 10.

The fasteners 58 are fixed into place in the covering 16, yet are free to move along the length of one of the tracks 54 and along the lengths of one of the extensions 20. This connection facilitates movement of the sliding guides 56 along the one of the tracks 54 as the covering 16 is deployed. When multiple sliding guides 56 are used along each track 54, the distance between each sliding guide 56 is fixed such that the covering 16 is substantially held in place upon deployment since the sliding guides 56 only have one degree of freedom. Namely, that degree of freedom is along the length of the track 54 to which the sliding guide 56 engages.

Figure 10A:
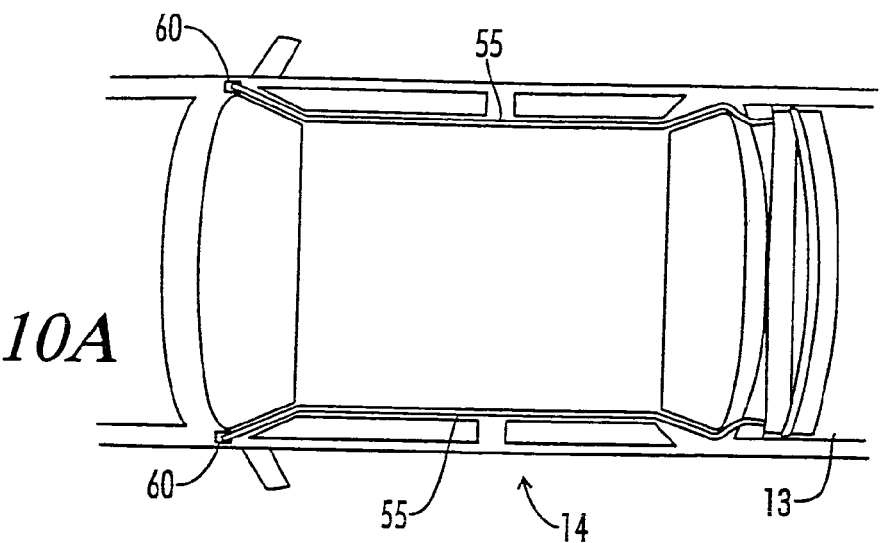
FIG. 10*a* is a top view of an automobile with an alternate embodiment of the current invention attached to the trunk of the automobile and tracks extended from the trunk of the automobile to the base of the front windshield.
Figure 10B:
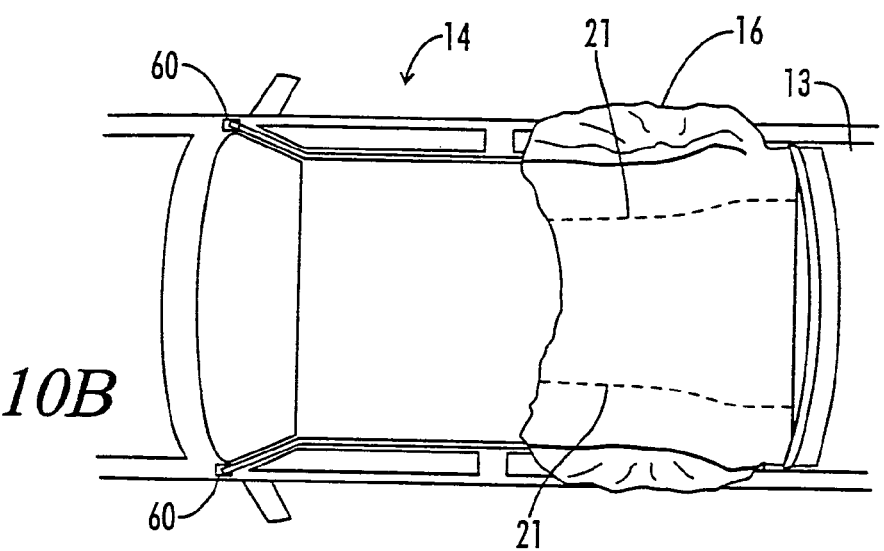
FIG. 10*b* shows a top view similar to FIG. 10*a* FIG. 10*b* shows the covering partially deployed.
Figure 10C:
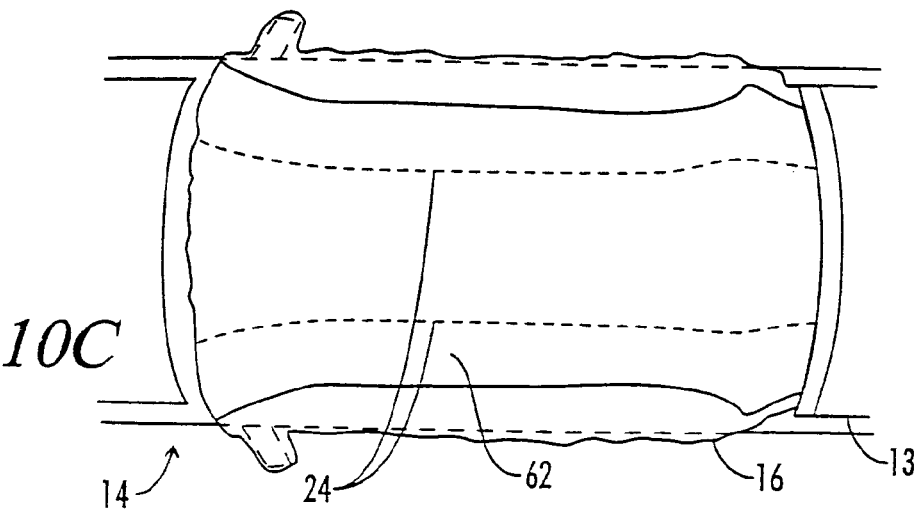
FIG. 10*c* shows top view similar to FIGS. 10*a* and 10*b*.
Figure 11:
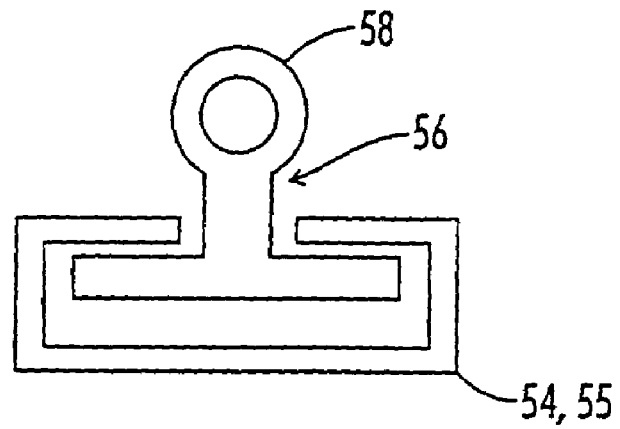
FIG. 11 is a cross sectional view of the relationship between the sliding guide and the track.
Figure 12:
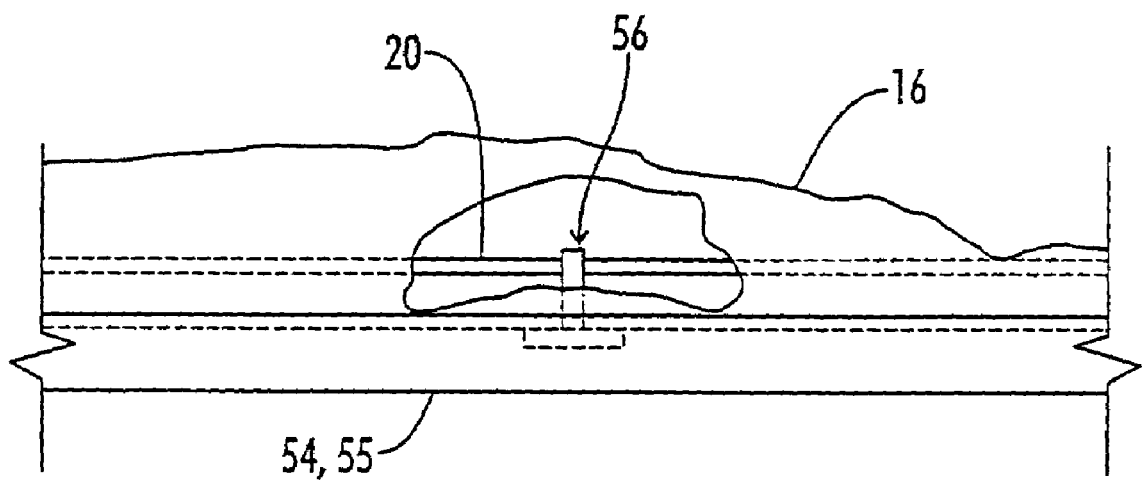
FIG. 12 shows a partial cut away view of the relationship between the sliding guide, covering, extension, and track.

As seen in FIG. 10, an alternate embodiment of the device 10 includes cables 21. The cables 21 are positioned within a plurality of tracks 55 that extend from the base of the front windshield to the base of the rear glass. The cables 21 are attached to the cloth 16 and are routed around an end cylinder 60 and a drum 18. Rotation of the drum 18 causes both rotation of the cable 21 around the end cylinder 60 and the drum 18 and movement of the cloth 16 from its collected position as seen in FIG. 10a to its extended position as seen in 10c. In this embodiment of the device 10, the device 10 can be positioned on or in the trunk 13 of the automobile 14 or in or on the hood 11 of the automobile 14.

In an alternate embodiment, the covering 16 of the device 10 includes an inflatable section 62 providing additional insulation properties to the covering 16 to help reduce heat transfer into the automobile 14. In this embodiment, the inflatable section can be designed such that it raises a portion of the covering 16 off of the automobile 14 to reduce heat transfer and to the automobile 14.

METHODS

Several methods are also disclosed. The first of which includes deploying a covering 16 over the windows 12 of an automobile 14. This method includes attaching a covering 16 to a plurality of extensions 20 and radially extending the plurality of extensions 20 from a centralized location 18. This radial extension does not have to continue precisely in a radial direction throughout the entire extension. The covering and extensions can be adapted to conform to the automobile 14 in question in order to provide coverage over the windows 12 of the automobile 14.

A method of collecting a covering 16 from the windows 12 of an automobile 14 is also disclosed. This method includes attaching a covering 16 to a plurality of extensions 20 and radially retracting a plurality of extensions 20 to a centralized location 18. Once again this retraction does not have to be only in a purely radial direction and can include winding the plurality of extensions 18 around the centralized location 18.

Another method for covering the windows 12 of an automobile 14 is disclosed. This method comprises attaching a covering 16 to a plurality of cables 20, attaching the cables 20 around a plurality of cylinders 16, routing the plurality of cables 20 along at least one track 55, and rotating the plurality of cylinders 60. This method provides for retracting and extending the covering 16 through opposite rotation of the cables 23. For example, a counterclockwise rotation would deploy the covering, while a clockwise rotation would retract the covering. This separated rotation can be accomplished through a series of clutches and gears used to facilitate rotation of a centralized location 18 while allowing the free rotation of an adjacent part of the centralized location 18.

Thus, it is seen that the apparatus of the present invention readily achieves the ends and advantages mentioned as well as those inherent therein. While certain preferred embodiments of the invention have been illustrated and described for purposes of the present disclosure, numerous changes in the arrangement and construction of parts may be made by those skilled in the art, which changes are encompassed within the scope and spirit of the present invention as defined by the appended claims.

What is claimed is:

1. An automated device for covering the windows of a vehicle, comprising:
   a collection container;
   a plurality of extensions attached to the collection container and positioned to be substantially retained within and extended from the collection container;
   a motor attached to the collection container to rotate the collection container, whereby rotation of the collection container extends and retracts the plurality of extensions;
   a covering attached to the plurality of extensions and sized to cover the windows of the automobile; and
   a top attached to the collection container and positioned to retain the covering when the plurality of extensions are retracted.

2. The device of claim 1, further including a based attached to the collection container and positioned to engage the vehicle.

3. The device of claim 1, wherein the top further includes:
   a cylinder;
   a lid;
   a plurality of rods extending radially from the cylinder; and
   a plurality of adjustable adjuncts hinged to the lid, each adjunct attached to one of the rods, whereby rotation of the cylinder opens and closes the plurality of adjustable adjuncts.

4. The device of claim 1, wherein:
   extension of the plurality of extensions deploys the covering; and
   retraction of the plurality of extensions collects the covering.

5. The device of claim 1, wherein the covering includes a plurality of sleeves and each extension is positioned within one of the sleeves.

6. The device of claim 1, wherein the plurality of extensions includes attachment ends connecting each extension to the covering.

7. The device of claim 1, wherein the covering includes reflective fabric.

8. The device of claim 7, wherein the reflective fabric is substantially opaque to sunlight.

9. The device of claim 1, further comprising a control system controlling the operation of the motor.

10. The device of claim 1, wherein the plurality of extensions comprises semi-stiff metal strips.

11. The device of claim 1, further including a plurality of tracks position to guide the covering during deployment.

12. The device of claim 11, further including a plurality of sliding guides attached to the covering and positioned in one of the tracks to guide the covering during deployment.

13. The device of claim 12, wherein the plurality of extensions are cables.

14. The device of claim 1, wherein the device is attached to the roof of the vehicle.

15. The device of claim 1, wherein the device is positioned in the trunk of the vehicle.

16. An automated device for covering the windows of a vehicle, comprising:
- a base;
- a drum attached to the base;
- a top attached to the drum;
- a plurality of malleable strips attached to the drum;
- a cloth attached to the plurality of malleable strips and sized to cover the windows of the vehicle;
- a motor attached to the drum to rotate the drum, whereby rotation of the drum radially extends and retracts the plurality of malleable strips from the drum; and
- wherein extension and retraction of the plurality of malleable strips deploys the cloth from the top and collects the cloth within the top.

17. The device of claim 16, wherein the top further includes:
- a cylinder;
- a lid;
- a plurality of rods extending radially from the cylinder; and
- a plurality of adjustable flaps hinged to the lid, each flap is attached to one of the rods, whereby rotation of the cylinder opens and closes the plurality of adjustable flaps.

18. The device of claim 16, wherein each malleable strip includes an attachment end connecting each malleable strip to the cloth.

19. The device of claim 16, wherein the cloth includes reflective fabric substantially opaque to sunlight.

20. The device of claim 16, further including
- a plurality of tracks operatively extending from the base; and
- a plurality of sliding guides attached to one of the tracks, engaging at least one of the malleable strips, and position to guide the cloth to cover the windows of the automobile.

* * * * *